United States Patent [19]

McKeon et al.

[11] Patent Number: 5,219,518

[45] Date of Patent: Jun. 15, 1993

[54] NUCLEAR OXYGEN ACTIVATION METHOD AND APPARATUS FOR DETECTING AND QUANTIFYING WATER FLOW

[75] Inventors: Donald C. McKeon, Houston; Jean-Remy Olesen, Sugar Land; Hugh D. Scott, Katy, all of Tex.

[73] Assignee: Schlumberger Technology Corporation, Houston, Tex.

[21] Appl. No.: 758,257

[22] Filed: Aug. 26, 1991

Related U.S. Application Data

[63] Continuation of Ser. No. 415,934, Oct. 2, 1989, abandoned.

[51] Int. Cl.$^5$ .................................................. G21C 1/06
[52] U.S. Cl. ................................. 376/166; 376/159; 376/161
[58] Field of Search .............. 376/246, 159, 157, 160, 376/161, 166; 250/270

[56] References Cited

U.S. PATENT DOCUMENTS

| | | | |
|---|---|---|---|
| 3,379,882 | 4/1968 | Youmans | 250/264 |
| 3,514,598 | 5/1970 | Youmans | 546/173 |
| 3,603,795 | 9/1971 | Allaud | 250/83.3 |
| 3,710,112 | 1/1973 | Caldwell et al. | 376/164 |
| 3,789,217 | 1/1974 | Youmans | 250/265 |
| 3,817,328 | 6/1974 | Neuman | 166/250 |
| 4,032,778 | 5/1977 | Paap et al. | 250/266 |
| 4,032,779 | 6/1977 | Arnold et al. | 250/264 |
| 4,032,780 | 6/1977 | Paap et al. | 250/266 |
| 4,032,781 | 6/1977 | Arnold | 250/265 |
| 4,076,980 | 2/1978 | Arnold et al. | 250/270 |
| 4,169,979 | 10/1979 | Arnold et al. | 250/266 |
| 4,189,638 | 2/1980 | Arnold | 250/259 |
| 4,233,508 | 11/1980 | Arnold | 250/259 |
| 4,501,964 | 2/1985 | Arnold | 250/270 |
| 4,573,193 | 3/1986 | Arnold et al. | 250/270 |
| 4,661,701 | 4/1987 | Grau | 250/270 |
| 4,737,636 | 4/1988 | Smith, Jr. | 250/269 |

OTHER PUBLICATIONS

"The Aluminum Activation Log" from H. D. Scott and M. P. Smith, in the Log Analyst, Sep.-Oct. 1973, pp. 3-12.

"Used for Pulsed-Neutron Sources for Flow Measurements in Reactor Reasearch" by Paul Kehler, American Nuclear Society Trans., pp. 141-142, 30 Nov. 1978.

"Advances in Nuclear Production Logging" by P. A. Wichmann et al., Trans., SPWLA (1967).

"The Oxygen Activation Log, a Laboratory Evaluation" by H. J. Paap et al. Proceedings of the International Symposium on Class I & II Injection Well Technology, May 8-11, 1989, pp. 25-43.

(List continued on next page.)

Primary Examiner—Donald P. Walsh
Assistant Examiner—Neena Chelliah
Attorney, Agent, or Firm—John H. Bouchard; Henry N. Garrana

[57] ABSTRACT

A nuclear spectroscopy method and apparatus for obtaining qualitative and quantitative information related to water flow, comprising the steps of:

(1) irradiating the water flow with a source of neutrons of sufficient energy to interact with oxygen atoms in the water according to the activation reaction $O^{16}(n,p)N^{16}$;

(2) detecting and counting, with at least at a detector, the gamma rays emitted during disintegration of $N^{16}$;

(3) making a plot of the counts versus time; and (4) deriving from said plot information related to said water flow.

The radiation is advantageously interrupted after a given period of time, and is preferably immediately followed by the detection. The water flow velocity "V" is calculated from the formula $V = d/t$, where "d" is the distance between the source and the detector(s), and "t" is the time period between the irradiation and the time corresponding to a characteristic on said plot, representative of the water flow and departing from the $N^{16}$ exponential decay curve. The characteristic takes different forms on the plot according to the duration of the irradiation.

26 Claims, 10 Drawing Sheets

OTHER PUBLICATIONS

"Practical Experience with Oxygen Activation Logging in South Mississipi" by J. B. Wienseneck, Id, pp. 7-24.

"Quantitative Monitoring of Water Flow Behind and In Wellbore Casing" from D. M. Arnold and H. J. Paap, SPE, Jan. 1979.

"Examples of Detection of Water Flow by Oxygen Activation on Pulsed Neutron Logs" by W. H. M. DeRosset, in Paper CCC of SPWLA Twenty-seventh annual logging symposium, Jun. 9-13, 1986.

"Measuring Behind Casing Water Flow" by T. M. Williams, presented on May 5-7 at the International Symposium on Subsurface Injection of Oilfield Brines, in New Orleans.

"New Instrumentation and Interpretive Methods for Identifying Shielded Waterflow Using Pulsed Neutron Technology", by F. L. Hill III et al., Twelfth Formation Evaluation Symposium, Sep. 26-29, 1989, Calgary, Alberta, Canada, Paper S.

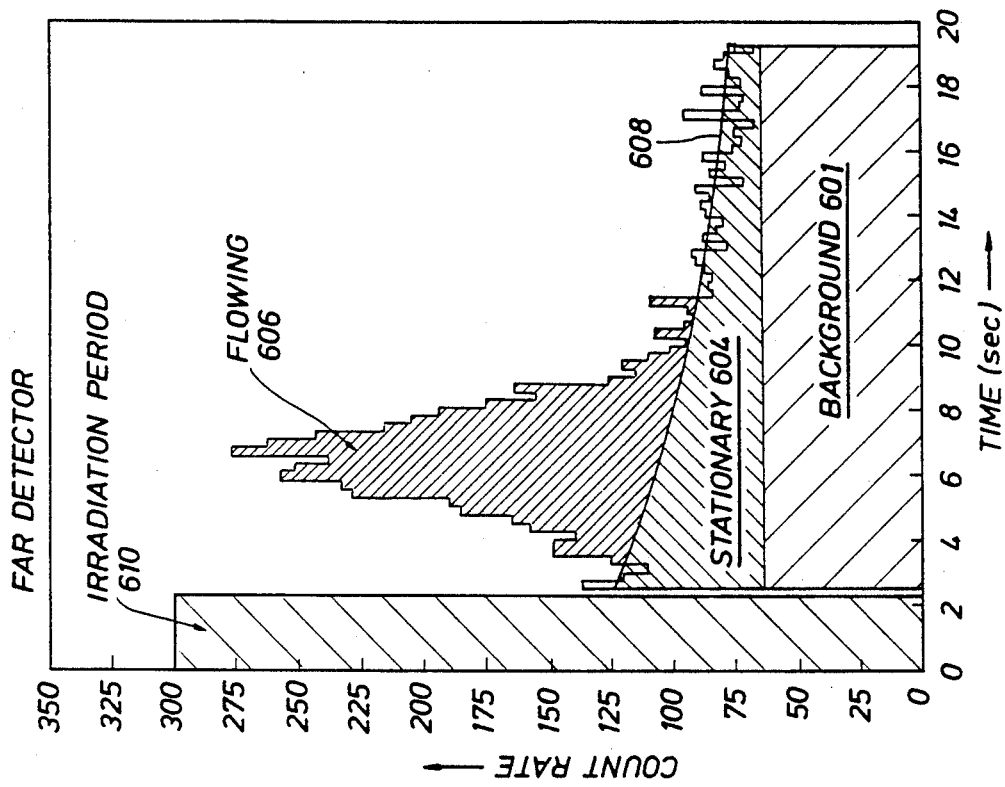
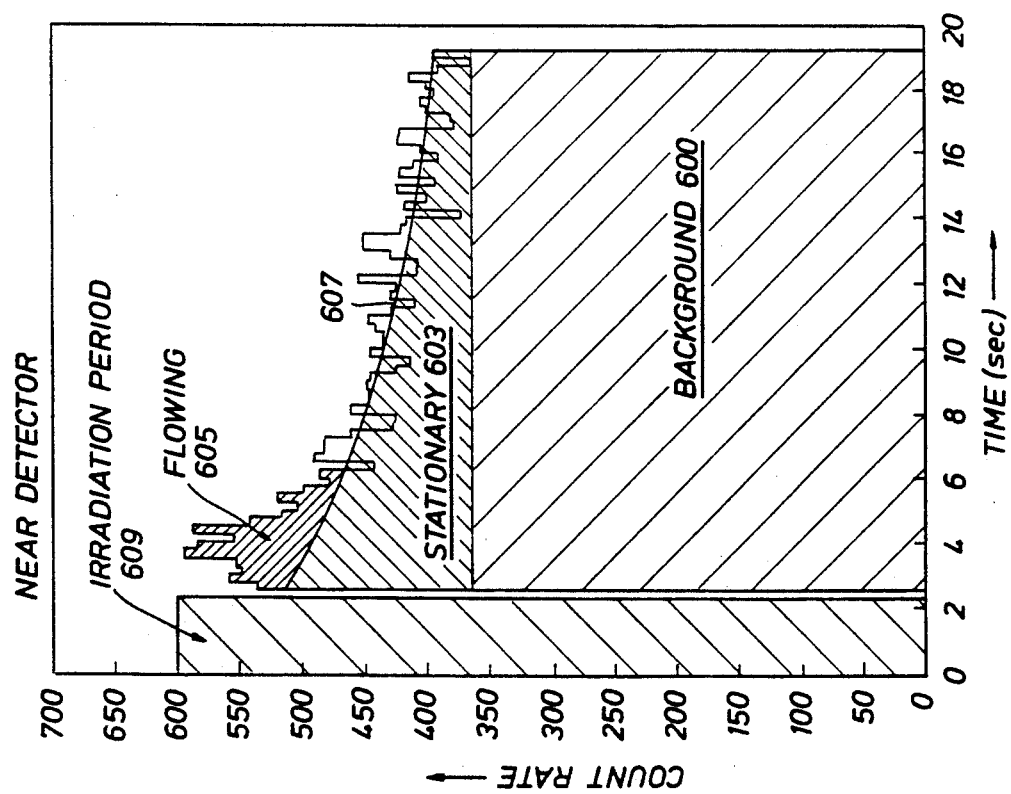

NUCLEAR OXYGEN ACTIVATION METHOD AND APPARATUS FOR DETECTING AND QUANTIFYING WATER FLOW

This is a continuation of application Ser. No. 07/415,934 filed Oct. 2, 1989.

BACKGROUND OF THE INVENTION

1. Field of the Invention

This invention relates generally to the detection and/or quantification of water flow, in particularly water flow which is not directly accessible, such as in a pipe, or water flow occurring in a borehole primarily designated to oil production. The present invention can e.g. find application in the production logging techniques directed to the analysis of producing oil wells, or in the injection wells techniques for determining the mechanical integrity of such wells. The invention allows one to provide qualitative and quantitative information related to water flow in a borehole, such e.g. between the casing and the earth formation surrounding the borehole.

2. Description of the Related Art

As known in the art of logging techniques, a well which has been determined to be promising for oil production, is provided with a metallic casing, and cement is injected between the earth formation and the casing. Perforations are then made through the casing/cement and in the oil productive formation, so as to allow oil to flow up to the surface through a tubing beforehand arranged in the well coaxially to the casing. It is of great importance to identify fluid points of entrance to or exit from the borehole, as well as to determine the mechanical integrity of the cement annulus. However, unwanted vertical flow of water can occur in the cement, between the casing and the formation. This phenomenon, usually called "water channeling", causes undesirable paths between formations located at different depths, i.e. at different pressures, e.g. by allowing water from a first formation layer to mix with oil coming from a second formation layer. This phenomenon disturbs substantially the oil production.

The invention may also be used, besides the production wells hereabove referred to, in the so-called "injection wells" which include different categories of wells. In a first category, a high pressure fluid is injected in a first well so as to make the oil move in earth formation towards a neighboring second well which will become the oil producing well. A second category of well is used for disposing of either fluids associated with the production of oil (such as salt water), or liquid hazardous wastes. In both categories, it is important to determine the mechanical integrity of such wells so as to prevent the injected fluid from contaminating underground sources of drinking water. Such contamination is usually due to some cracks or channels in the cement annulus and/or in the formation close to the well wall. The injection wells are submitted to stringent regulations with this respect. In the United States, for example, the requirement is such that a test of the mechanical integrity of the well, so as to determine the presence of any leak, be done prior to initial injection and further periodically (every five years).

Among the various methods which have been proposed for detecting and characterizing water flow in a well, such as the flow behind casing, is the nuclear method referred to as "oxygen activation", as described e.g. in the article "Advances in nuclear production logging" by P. A. Wichmann et al., Trans., SPWLA (1967). This method is carried out with a tool including a nuclear source emitting high energy neutrons and a gamma ray detector. Oxygen atoms in the water, when interacting with neutrons of sufficient energy, are activated to an unstable state in the form of nitrogen-16 which decays back exponentially in time with a half-life of 7.13 seconds, to stable oxygen-16 while emitting 6.13 Mev and 7.12 Mev gamma rays. This reaction is also referred to as "$O^{16}(n,p)N^{16}$" reaction. Count rates in the gamma ray detector are proportional to the total amount of oxygen present around the tool.

An operative oxygen activation logging tool, as described in Louis A. Allaud U.S. Pat. No. 3,603,795 and assigned to Schlumberger Technology Corporation, has been proposed for measuring the speed of water in a polyphase flow, by setting the ratio of the counts referring to the respective near and far detectors.

Some attempts have been made towards a better understanding of the oxygen activation method, see e.g. the article "Quantitative Monitoring of Water Flow Behind and In Wellbore Casing" from D. M. Arnold and H. J. Paap, Journal of Petroleum Engineers of AIME, pages 121–130, Jan. 1979. Based on these experiments, an operative logging tool provided with two detectors has been proposed, as depicted in the article "Measuring Behind Casing Water Flow" by T. M. Williams, presented on May 5–7, 1987 at the International Symposium on Subsurface Injection of Oilfield Brines, in New Orleans. The ratio of the counts from the respective near and far detectors is an exponential function of the velocity of the detected water flow. Some other quantitative information, i.e. the radial distance of the water flow and the volume flow rate are estimated through further calculations.

However, these known methods suffer from major drawbacks. Firstly, they require two detectors, which increases the cost. Secondly, the measurements require long measuring periods in the well, such as several minutes. Thirdly, a prior calibration is needed, even for the mere determination of the velocity of the water flow. In other words, the response of the tool has to be measured when submitted to given external conditions, i.e. to different flow velocities, flow rates, and radial distances of flow, so as to obtain a set of reference signals. These reference measurements, allegedly corresponding to stationary oxygen, are then subtracted from actual measurements. The calibration may be carried out either in a laboratory set-up especially built for that purpose, or in a region of the well assumed to be free of any water flow behind casing but otherwise showing characteristics identical to those of the region of the well under investigation. However, calibration is time consuming and thus costly, and, when carried out in the well, is relatively not reliable since there is no certainty that the region chosen as a reference is actually representative and free of any water leakage. Finally, these known methods are limited with respect to the velocity range of the water flow able to be detected with accuracy, especially in relatively low velocities, below e.g. 3 feet/minute (i.e. 0.016 m/s). This is due in part to the limitations deriving from the calibration process hereabove described. This is all the more detrimental since the velocities of the water flow encountered in a well are often low, i.e. below 3 feet/minute.

Furthermore, the oxygen activation method per se raises another difficulty. The emitted neutrons interact with, and thus activate, all of the oxygen atoms surrounding the tool, i.e. the "flowing oxygen" and the "immobile oxygen". The immobile oxygen is present in the earth formations, in the cement, and in the oxygen bearing fluid which is stationary. The flowing oxygen is the oxygen present in the fluids flowing either downward or upward. The above mentioned known methods attempt to differentiate the flowing oxygen from the immobile oxygen by establishing, through calibration, a set of reference data corresponding to the absence of flow. However, the calibration suffers from severe limitations already hereabove referred to with this respect.

There has been also some attempts to optimize the oxygen activation method by monitoring the tool speed in the well according to the water flow velocity, as e.g. depicted in the article "Examples of Detection of Water Flow by Oxygen Activation on Pulsed Neutron Logs" by W. H. M. DeRosset, in Paper CCC of SPWLA Twenty-seventh annual logging symposium, Jun. 9–13, 1986. However, this method relies on the prior knowledge or estimation of the water flow velocity, and is further sensitive to the spacing between the source and the detectors.

U.S. Pat. No. 4,574,193 shows a method wherein an oxygen activation tool is run twice in the well at two different logging speeds. The water velocity is derived from a displacement distance "D" which reflects the time required for the activated fluid to reach a detector. Nevertheless, the calculation is relatively complicated. Furthermore, this method requires the logging speed be less than the water velocity, which is a drastic limitation since it implies an a priori assumption of the velocity which is the data to be determined.

Many endeavors have been made to improve the oxygen activation method for the detection of water flow, either by combining the oxygen activation method with other logging methods (see e.g. U.S. Pat. Nos. 3,817,328; 4,233,508 and 4,737,636), or with prior knowledge of environmental conditions (see e.g. U.S. Pat. No. 4,032,781), or by designing the detectors with a specific geometry (see e.g. U.S. Pat. No. 4,032,779), or further by setting up a relationship for the ratio of count rates at a detector in two distinct energy regions of the gamma ray spectrum (see e.g. U.S. Pat. No. 4,032,778). All these methods show the drawbacks already referred to hereabove, since they do not depart in principle from the basic oxygen activation method hereabove discussed.

According to the above, there is a need for a reliable method for obtaining quantitative and qualitative information related to water flow, and in a specific application, to water flow behind casing, either for production well analysis or for mechanical integrity test in injection wells.

SUMMARY OF THE INVENTION

An object of the invention is an oxygen activation method and apparatus providing reliable quantitative and qualitative information on water flow, and especially providing the velocity of the water flow, through simple calculation and without any prior calibration.

Another object of the invention is to provide measurements irrespective of specific dimensions of the apparatus and/or of the displacement speed of the apparatus (i.e. the logging speed in well application) with respect to the flow.

A further object of the invention is to distinguish the flowing oxygen (related to the flow) from the stationary oxygen.

An even further object of the invention is to provide information through measurements of short duration, and to design an apparatus of reasonable length.

A still further object of the invention is to derive data from a single detector.

The foregoing and other objects are attained in accordance with the invention by a nuclear method for obtaining qualitative and quantitative information related to water flow, comprising the steps of:

(1) irradiating the water flow with a source of neutrons of sufficient energy to interact with oxygen atoms according to the activation reaction $O^{16}(n,p)N^{16}$;

(2) detecting and counting, at least at a first location spaced from said source, the gamma rays emitted during disintegration of $N^{16}$;

(3) establishing the relationship between the counts and time; and (4) deriving from said relationship information related to said water flow.

More particularly, the irradiating step is interrupted after a given period of time. Preferably, the detection step starts substantially immediately after the interruption of irradiation.

The invention also sets forth a nuclear method for obtaining qualitative and quantitative information related to water flow, comprising the steps of:

(1) irradiating the water flow with a source of neutrons of sufficient energy to interact with oxygen atoms in the water, according to the activation reaction $O^{16}(n,p)N^{16}$;

(2) stopping the irradiating step;

(3) detecting and counting, at least at a first location spaced from said source, the gamma rays emitted during disintegration of $N^{16}$; and (4) deriving from said counting information related to said water flow.

Specifically, said deriving step includes detecting in said relationship, an anomaly or characteristic representative of the flow and departing from the exponential decay curve of $N16$ which is representative of the stationary oxygen.

Particularly, said deriving step further includes calculating the velocity "V" of the water flow from the formula $$V=d/t,$$

where "d" is the distance between the source and the detecting location, and "t" is the time period between the irradiating step and the time corresponding to said characteristic in said relationship.

Advantageously, the method includes carrying out, at the same place with respect to the flow, several cycles of irradiating/detecting steps.

According to a first set of embodiments, the duration of said irradiating step is of the order of magnitude of the half-life of $N^{16}$, e.g. comprised between a fifth and three times said half-life.

In that case, the method may include advantageously the step of determining the time corresponding to a peak representative of the flow in said relationship, and calculating the velocity of said flow from the time period between the mid-time of the irradiating step and the time corresponding to the maximum of said peak.

According to a second set of embodiments, the duration of said irradiating step is a multiple of said half-life, e.g. between three and fifteen times. In this case, the method includes preferably interrupting the irradiating step after the counts have been on a steady state for a duration of a few $N^{16}$ half-life, and determining in said relationship the time corresponding to said anomaly characteristic, in the form of an abrupt decrease representative of the flow, and calculating the velocity of the water flow from the time period separating the end of the irradiating step and the time corresponding to said abrupt decrease.

According to another feature of the invention, the method comprises the steps of:

(1) detecting and counting, at a first location and at a second location, both spaced from said source, the gamma rays emitted during disintegration of $N^{16}$;

(2) establishing a first relationship and a second relationship between the counts and time, corresponding to the respective first and second locations; and (3) combining said first and second relationships and deriving, from the resulting combination, information related to said water flow.

According to the above mentioned feature, the method includes determining from the first relationship a first characteristic representative of the flow, determining from the second relationship a second characteristic representative of the flow, and calculating the flow velocity from the time period between the times corresponding respectively to first and second characteristics.

Furthermore, the method includes deriving the water flow rate "Q" from the formula:

$$Q = F \times C_{flow}/S_{total}$$

where $C_{flow}$ is the number of counts representative of the flow, $S_{total}$ is the total number of neutrons emitted during the irradiating step, and "F" is a function of environmental parameters and may also be a function of the velocity "V". $C_{flow}$ is preferably calculated as the area of said characteristic representative of the flow in said relationship.

The present invention also contemplates a nuclear apparatus for obtaining qualitative and quantitative information related to water flow, comprising:

(1) means for irradiating the water flow with a source of neutrons of sufficient energy to interact with oxygen atoms according to the activation reaction $O^{16}(n,p)N^{16}$;

(2) means for detecting and counting, at least at a first location spaced from said source, the gamma rays emitted during disintegration of $N^{16}$;

(3) means for establishing the relationship between the counts and time; and (4) means for deriving from said relationship information related to said water flow.

More particularly, said irradiating means is operated during an irradiating period preceding the detecting period during which said detecting means is operated.

Specifically, said deriving means includes means for calculating the velocity "V" of the water flow from the formula: $V = d/t$, where "d" is the distance between the source and the detecting location, and "t" is the time period between the irradiating period and the time corresponding to a characteristic of said relationship, representative of the water flow.

According to another feature of the invention, the apparatus comprises:

(1) means for detecting and counting, at a first location and at a second location, both spaced from said source, the gamma rays emitted during disintegration of $N^{16}$;

(2) means for establishing a first relationship and a second relationship between the counts and time, corresponding to the respective first and second locations; and (3) means for combining from said first and second relationships, and for deriving from the resulting combination information related to said water flow.

The characteristics and advantages of the invention will appear better from the description to follow, given by way of a non limiting example, with reference to the appended drawing in which:

BRIEF DESCRIPTION OF THE DRAWINGS

FIGS. 5A and 5B show respective histograms similar to the plots of FIGS. 2A and 2B, corresponding to a fourth example of irradiating/detecting cycle;

DESCRIPTION OF THE PREFERRED EMBODIMENTS

The invention will be hereafter depicted in connection with the logging techniques, and especially with the detection and quantification of water flow behind casing in a borehole. However, it should be borne in mind that this is one of the many applications of the invention which, by way of example, could alternately be used for obtaining information on water flow, or water in a polyphase flow, in a pipe.

Figure 1:
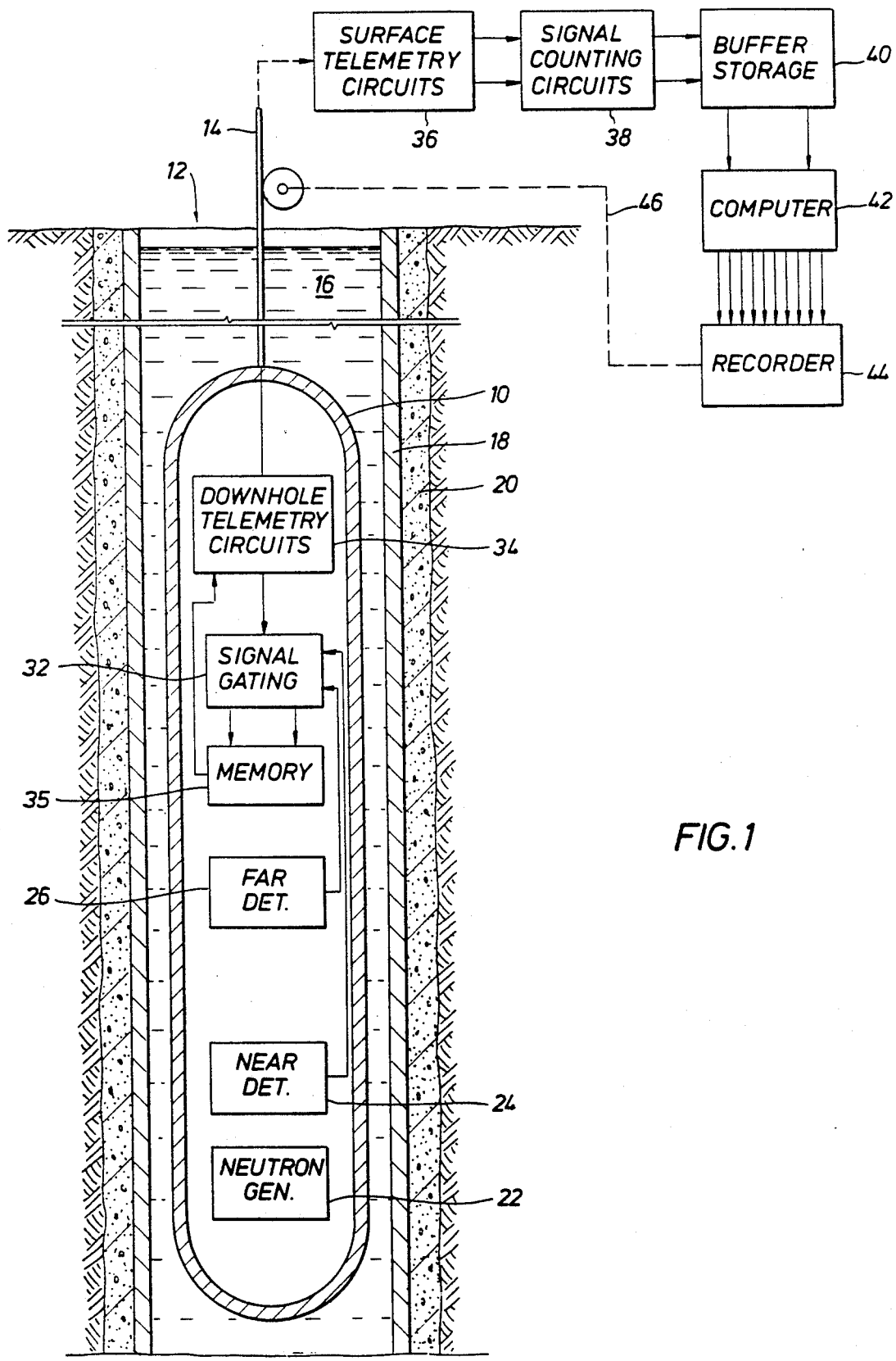
FIG. 1 is a block diagram of an example of application of the invention in the form of a logging tool including two detectors.

An example of an embodiment of the invention is described and illustrated herein FIG. 1 showing a spectroscopy logging tool 10 suspended in a borehole 12 by an armored cable 14. The tool 10 might be e.g. of the type described in Peter D. Wright U.S. Pat. No. 4,721,853, issued on Jan. 26, 1988 and assigned to Schlumberger Technology Corporation, and which is herein incorporated by reference.

FIG. 1 shows a well logging tool constructed in accordance with an example of embodiment of the invention and including a fluid-tight, pressure-and-temperature resistant sonde or tool 10 that is adapted to be suspended in and moved through a well bore 12 by an armored cable 14. The well bore 12 is illustrated as containing a borehole fluid 16 and as including a steel casing 18 and surrounding cement annulus 20. Although no tubing is shown in the borehole, the tool 10 may if desired be sized for through-tubing use.

The downhole tool 10 includes a pulsed neutron generator 22 and two radiation detectors 24 and 26 that are located at different distances (or spacings) from the neutron generator 22. The detector 24 spaced closest to the neutron generator is designated the "near" detector and the detector 26 located farther from the neutron source is designated the "far" detector. For the illustration of the present invention, the neutron generator 22 is of the type which generates discrete pulses of fast neutrons, e.g. 14 Mev, and may for example be of the types described in more complete detail in C. Goodman U.S. Pat. No. 2,991,364, dated Jul. 4, 1961, and A. H. Frentrop U.S. Pat. No. 3,546,512, dated Dec. 8, 1970. This source emits 14 Mev neutrons having an energy level above the 10.2 Mev threshold energy level needed for the oxygen activation. Operation of the neutron generator 22 is controlled as usual by a neutron generator control circuit (not shown) which may also be of the type described in the aforementioned patents. The detectors 24 and 26 may be of any construction suitable for the detection of gamma rays, such as thallium-activated sodium iodide scintillation detectors or bismuth germanate crystal detectors, and, in this respect, will be understood to include the usual photomultiplier tubes, photomultiplier high voltage supplies, and amplifier-discriminators (not shown). It will also be understood that other downhole power sources (not shown) are provided as required to drive the neutron generator 22 and other downhole circuits. Power for the wall tool 10 is supplied over the cable 14 from a surface power supply (not shown), as is conventional.

Output pulses from the near detector 24 and the far detector 26 are applied to signal gating circuit 32 where the detector signals are counted and stored in memory and therefrom are applied to downhole telemetry circuits 34 for transmission to the surface over the cable 14. The overall design of the neutron generator control circuit, the signal gating circuits 32, the memory, and the telemetry circuits 34 are similar to that described in U.S. Pat. No. 4,721,853, but are not described here for the sake of brevity. These circuits are designed to achieve the timing schedules for neutrons emission and gamma rays detection according to that discussed in detail below.

The downhole telemetry circuits 34 may be of any known construction for encoding, time division multiplexing, or otherwise preparing the data-bearing signals. At the earth's surface, the data-bearing signals from the near and far detectors 24 and 26, respectively, are amplified, decoded, demultiplexed and otherwise processed as needed in the surface telemetry circuits 36, which may also be conventional. The telemetry circuits 34 and 36 also include circuits for the receipt and transmission, respectively, of command messages from the surface. Suitably, the circuits 34 and 36 comprise a bi-directional data telemetry system useful for these purposes and having at least a 10K bit per second upward data rate.

Following surface telemetry circuits 36, the near-detector and far-detector signals are separately counted in signal counting circuits 38 to acquire the counts data over a desired period of time and then transferred to storage buffers 40.

From storage 40, the count data are processed in a computer 42, which suitably comprises a microprocessor or, alternatively, a general purpose digital computer such as that manufactured by Digital Equipment Corporation, Maynard, Mass., under the designation PDP-11. As is described more fully herebelow, the computer 42 processes the count data from the respective detectors to develop various desired outputs which may be recorded in conventional fashion as a function of tool depth in a recorder 44. The usual cable-following mechanical linkage, indicated diagrammatically at 46 in FIG. 1, is provided for this purpose.

As a matter of general interest, it is means here by "downward fluid", fluid flowing downward in the borehole, and by "upward fluid", fluid flowing upward in the borehole. Generally, the method and apparatus according to the invention allow the distinction of the oxygen representative of the flowing oxygen (either upward or downward flow), from the immobile oxygen, i.e. part of stationary fluid, and/or cement, and/or earth formation. Accordingly, for the sake of brevity, "stationary oxygen" means, within the whole text of the present application, the immobile oxygen. In the example described, where the detector(s) is (are) placed above the source, the method of the invention will give results more sensitive to upward flow than to downward flow. This comprehends most of the situations since, in injection wells, the downward flow represents the fluid purposely injected in the well and thus is not the flow the user is interested in. Furthermore, the injected fluid (downward flow) usually has a much greater velocity than the upward flow. Finally, the injected fluid (downward) takes place inside the casing and it is unusual that a downward flow and an upward flow (representative of leakage in the cement for instance) both occur at the same location in a well. Consequently, in the examples here described, the flow under investigation is the upward flow. Accordingly, "flow", or "flow under investigation" will hereafter indicate "upward flow". It is easily understood that, should the user be primarily interested in downward flow, the tool should be run in the well in an inverted configuration, wherein the source is above the detector(s). In the same vein, "fluid" here refers to water or fluid comprised of a substantially amount of water.

Figure 2A:
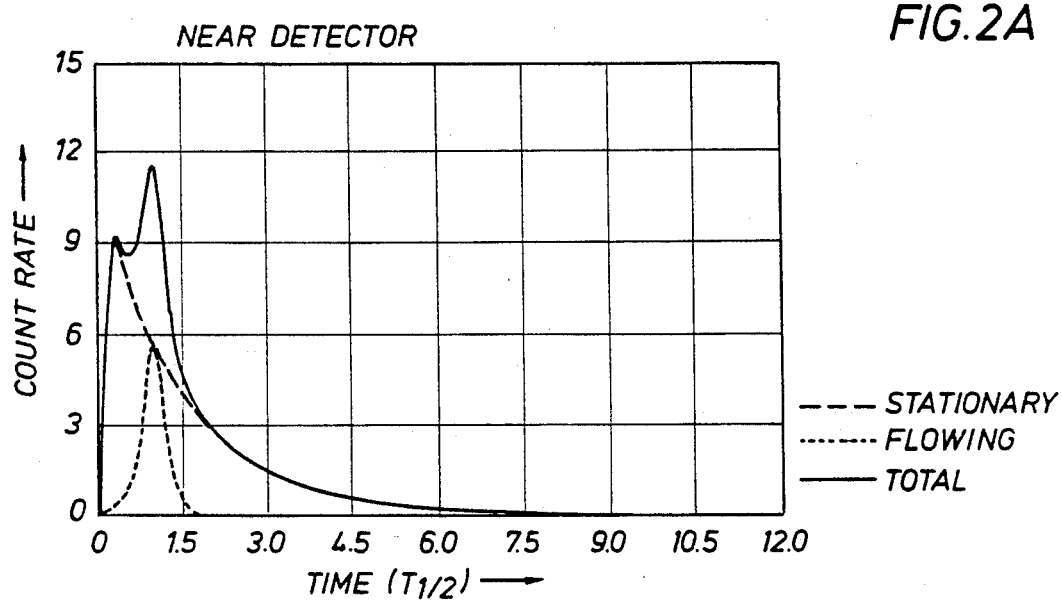
FIGS. 2A and 2B show schematic plots of the count rate detected respectively by the near and far detector, versus time, during a first example of irradiating/detecting cycle.
Figure 2B:
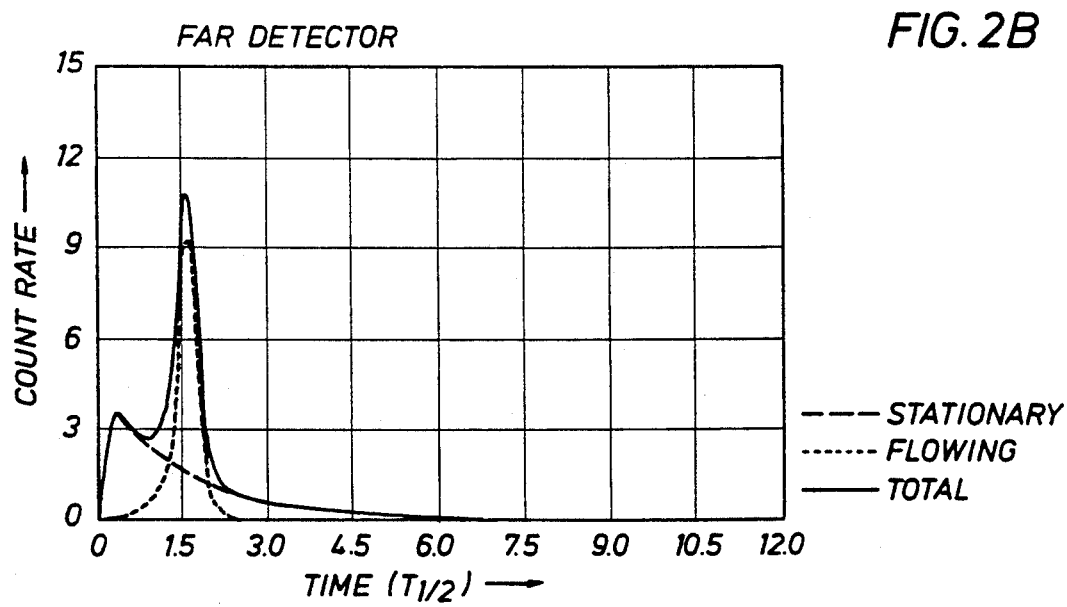
Figure 3A:
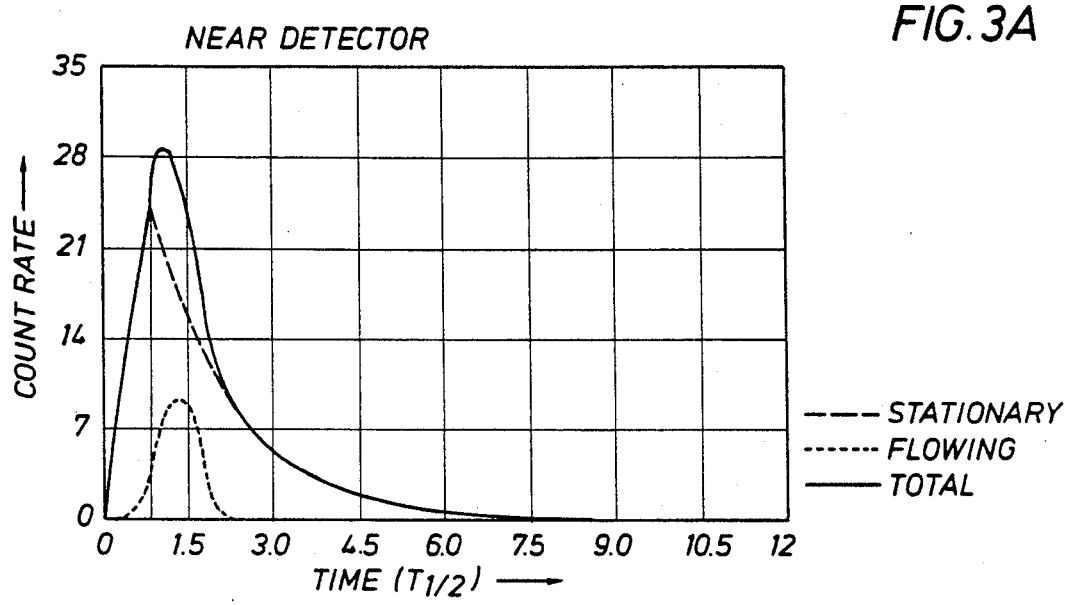
FIGS. 3A and 3B show respective plots similar to those of FIGS. 2A and 2B corresponding to a second example of irradiating/detecting cycle.
Figure 3B:
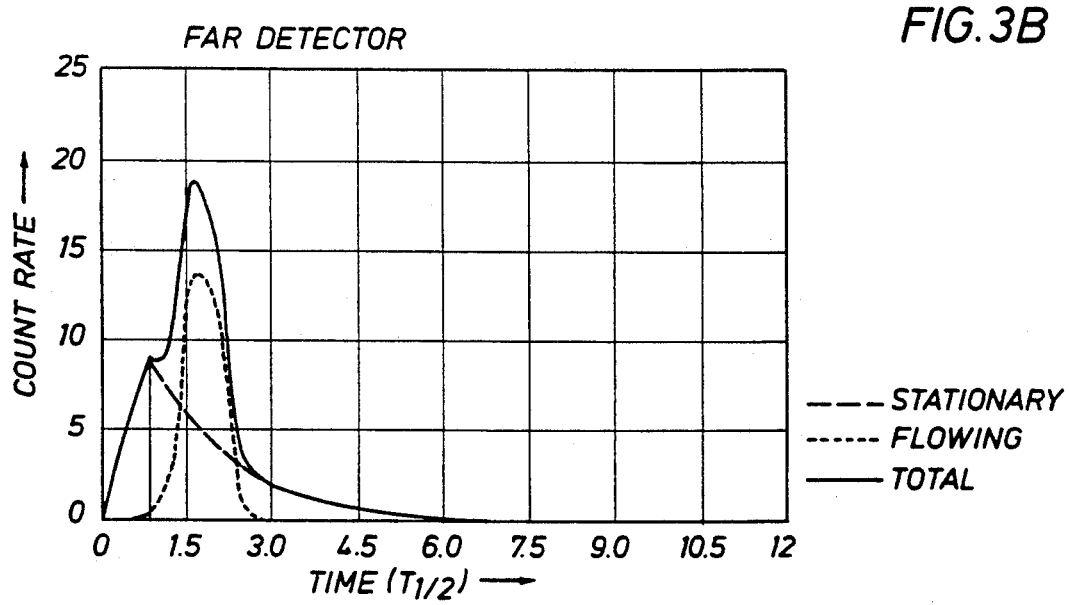
Figure 4A:
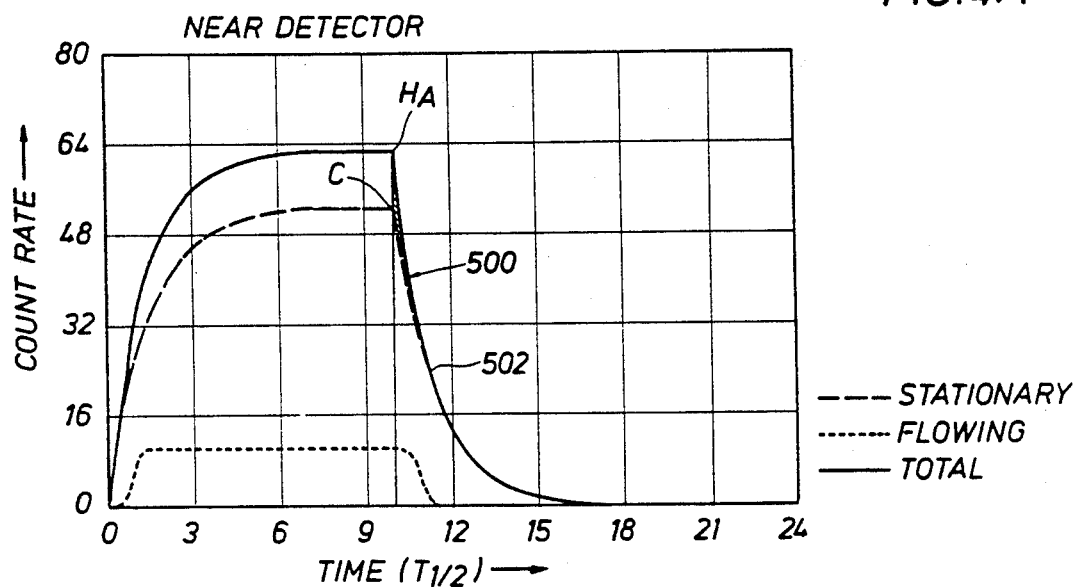
FIGS. 4A and 4B show respective plots similar to those of FIGS. 2A and 2B corresponding to a third example of irradiating/detecting cycle.

FIG. 2A, 2B, 3A, 3B, 4A and 4B, show each a plot of count rate versus time, resulting from calculations made from a simulation model including a source, a near detector and a far detector (all three in alignment), in the vicinity of which (and substantially parallel to which) is placed a water flow having a velocity of 11.5 feet/minute (0.05 m/s). FIG. 2A, 3A, 4A refer to the near detector, and FIG. 2B, 3B, 4B refer to the far detector. Each count rate is calculated as the number of counts detected during a time interval or "time bin," usually a few millisecond divided by the duration of said time interval. As a matter of general interest, the fact of plotting on the ordinate axis, either "counts" or "count rates", only implies a change of scale, and thus does not alter the spirit of the invention. Accordingly, and for the sake of brevity, the expression "counts versus time" will hereafter refer, unless otherwise specified, to count rates versus time. FIG. 2A, 2B correspond to an irradiating period of 2 seconds, FIG. 3A, 3B to an irradiating period of 5 seconds, and FIG. 4A, 4B to an irradiating period of 70 seconds. In FIG. 2A to 4B, the time units along the time axis are marked as multiples or fractions of half-life of $N^{16}$ (i.e. 7.12 seconds). Each plot on said figures includes a dashed curve, representative of the stationary oxygen, a dotted curve representative of the moving oxygen (i.e. the fluid flow), a solid curve corresponding to the total counts (as actually detected by the detector), and a vertical line marking the end of the irradiating period. The plots show "net" count rates, i.e. count rates from which have been removed the background noise (as explained hereafter).

although the figures depict an embodiment including a near detector and a far detector, it is of importance to notice that the method according to the invention is based on the processing of counts obtained from a single detector. The use of two detectors is optional and corresponds to alternative embodiments of the invention.

According to a preferred embodiment of the invention, the source is activated for a given period of time and then is deactivated. The resulting gamma ray are detected and counts are processed during a detecting period which preferably immediately follows the irradiating period. Advantageously, the detecting period is slightly delayed (for less than one second) with respect to the end of the irradiation; this allows stabilizing the tool and reducing the influence of the downward flowing oxygen (i.e. in general the fluid flowing in a direction opposite to the detector with respect to the source). Specifically, information is derived from an anomaly or characteristic, representative of the flow, and departing from the $N^{16}$ exponential decay curve which is representative of the stationary oxygen. The detection duration is e.g. comprised between one and fifteen $N^{16}$ half-life(s).

Advantageously, the irradiation-detection cycle is preferably repeated several times, between e.g. five and thirty times, while the apparatus remains at the same place with respect to the water flow.

Turning back to FIG. 2A and 2B, the counts are measured after an irradiating period of about 2 seconds. Every slug of activated fluid under investigation, as it gets closer and closer to a detector, generates an increase of counts, and, as it moves away from said detector, causes a decrease of counts. After a time dependent upon the source/detector spacing and the flow velocity, said slug does not contribute anymore to the counts. The total counts curve (solid curve) comprises (i) a characteristic representative of the flow, in the form of a peak, and (ii) an exponential decay curve representative of the stationary oxygen. Said peak includes information about the flowing oxygen and thus about the flow. The peak on FIG. 2A appears in time before the peak on FIG. 2B, since said slug passes by the near detector before the far detector.

According to the invention, the presence of fluid flow in the vicinity of a single detector is responsible, on the plots, for an anomaly or characteristic departing from the $N^{16}$ exponential decay curve. The detection of the flow relies on the presence of such characteristic (i.e. a peak in the examples shown in FIG. 2A, 2B, 3A 3B). The pictorial representation according to the invention, in the form of a plot of counts versus time, is vivid for the user who may, from a simple look at the plot, derive the presence of a flow. Above all, the method allows the determination of the water flow velocity "V" according to the simple formula $V=d/t$, where "d" is the distance between the source and the detector, and "t" is the time duration between the "irradiation or activation" and the "detection". More precisely, "t" could be defined as the difference between the mean time at which the flowing oxygen is activated and the mean time at which the flowing oxygen is detected. By way of example, starting from one plot of those of FIG. 2A 2B, 3A, 3B, i.e. using a tool provided with a single detector, "t" is the time between the midtime of the irradiating period and the maximum of the peak. The maximum (or middle, or center, or centroid) of said peak can be determined by any usual mathematical methods.

It should be noted that, according to the invention, the calculation of the velocity "V" does not require any calibration.

As an alternative embodiment, based on the use of a tool provided with a near and a far detector, the velocity "V" is calculated from both plots of FIG. 2A, 2B (or from plots of FIG. 3A, 3B), by the formula $V=d/t$, where "d" is defined as the distance between the near detector and the far detector, and "t" is the time difference between the respective maxima of the peaks on the respective plots.

On each of FIG. 3A, 3B is shown a plot of counts versus time following an irradiating period of 6 seconds, for a water velocity identical to the one of FIG. 2A, 2B. On FIG. 3A and 3B, the respective peaks appear earlier in time, and are less sharp, than the respective peaks on FIG. 2A, 2B. The plots of FIG. 3A and 3B may be used in the same manner as described in connection with FIG. 2A, 2B, for the detection of the flow and the determination of the flow velocity.

Figure 4B:
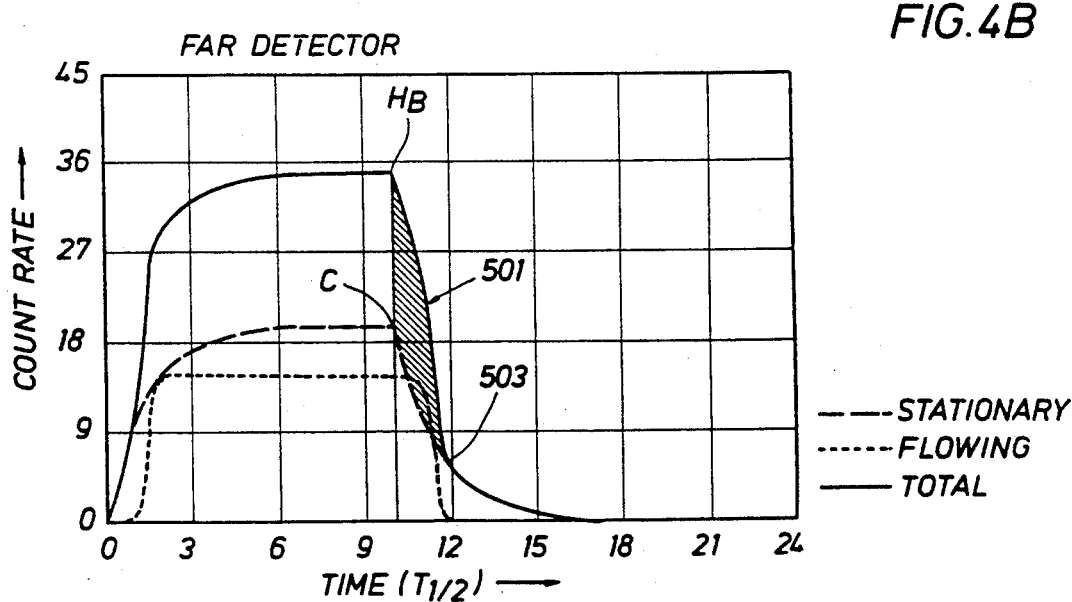

Now there is further described another example of implementation of the invention in relation to FIG. 4A and 4B, each showing a plot of counts versus time for, respectively, a near and a far detector, in presence of a water flow having the same velocity as the one related to FIG. 2A, 2B, 3A, 3B, i.e. 11.5 feet/minute (0.05 m/s). The irradiating period is 70 seconds, and thus is substantially longer than the respective irradiating periods corresponding to the plots of FIG. 2A, 2B, 3A and 3B. Unlike the plots of the set of FIG. 2 or 3, the plots of FIG. 4A and 4B do not show any peak. In other words, the anomaly or characteristic representative of the flow takes a form other than a peak. Accordingly, the detection of flow and the calculation of velocity are implemented in an alternative way with respect to the one hereabove described in connection with FIG. 2A, 2B, 3A and 3B. The water flow is revealed on the plots by an enhanced part followed by an abrupt decrease of the counts (referenced by 500, 501). The expression "abrupt decrease" means a substantial change of slope or concavity with respect to the $N^{16}$ exponential decay curve representative of the stationary oxygen. The abrupt decrease is more visible on the far detector plot of FIG. 4B than on the near detector plot FIG. 4A. The water flow velocity "V" is calculated by the hereabove mentioned formula $V=d/t$, where "d" is the distance between the source and the detector (either near or far), and "t" is the time between the end of the irradiating period (symbolized by the vertical line) and the time corresponding to the point on the plot (bearing the respective reference 502, 503) corresponding to the end of said abrupt decrease, i.e. where the change of concavity occurs.

According to another embodiment further related to FIG. 4A and 4B and involving the use of two detectors, the velocity is calculated from both plots of FIG. 4A and 4B, from the formula $V=d/t$, where "d" is the distance between the near and the far detector, and "t" is the time period between said respective times 502, 503 corresponding to the respective end of said abrupt decreases.

As an alternative method, also making use of both near and far detector plots of FIG. 4A and 4B, the velocity is calculated in the following way. The contribution of the flowing oxygen to the total counts is calculated by extrapolating, back to the end of the irradiating period, the N$^{16}$ exponential decay curve. The extrapolation gives a number of counts "C" being the contribution of the stationary oxygen to the total counts. The contribution of the flowing oxygen is the difference between the stationary contribution and the total counts. The velocity "V" is derived from the ratio of the contributions of the flowing oxygen for the respective detectors.

It could be useful in some instances, to enhance the accuracy of the plots of FIG. 4A, 4B, especially in the very first counts detected following the irradiating period. As a matter of fact, these first counts (corresponding to points H$_A$ and H$_B$ on the plots) are greatly influenced by statistics phenomenon. For reducing the resulting incertitude, the detection is carried out during at least a part of the irradiation. To this end, the source is preferably of the bursting type, i.e. it emits successive bursts of neutrons. The counts are detected during the time intervals separating successive bursts of neutrons.

As a general comment relating to FIG. 4A, 4B, these plots are obtained after having activated the source for a time duration long enough to allow the counts to be in a steady state in time (see the horizontal part of the curve on the plots) for at least a few half-lifes, and then the source is turned off.

The comparison of FIG. 2A, 2B with FIG. 3A, 3B and with FIG. 4A, 4B shows that the characteristic or anomaly, representative of the flow, takes different forms depending on the duration of the irradiation.

FIG. 5A and 5B each shows an histogram of counts versus time, where counts have been detected, during successive time intervals (e.g. of a fourth of a second), respectively by the near detector and the far detector of a tool disposed in the vicinity of a water flow having a velocity of about 20 feet/minute (0.1 m/s). The irradiating period is of 2.2 seconds. Each histogram shows a first hatched area 600, 601 corresponding to the background counts, a second hatched zone respective 603, 604 ;corresponding to the counts representative of the stationary oxygen, and a third hatched zone 605, 606 corresponding to the peak referred to in connection with FIG. 2A, 2B, 3A and 3B and which is representative of the flow. A fourth hatched zone respective 609, 610 symbolizes the irradiating period. The height in counts of zones 609, 610 has no particular significance with respect to the water flow velocity. The zones 603, 604 (stationary oxygen) are each delimited with the N$^{16}$ exponential decay curve (references 607, 608). Each exponential curve results: (i) in the part of the curve following in time the zone 605, 606 (upward flow) from an averaging of the corresponding histogram counts, and (ii) in the part of the curve preceding said zone 605, 606, from the "extrapolation" method hereabove described in connection with FIG. 4B. A preferred method for determining the respective values of the background "B", the extrapolation count number "C" (linked to stationary oxygen), and the peak value "P", consists in decomposing the gross count rate (as measured) into a constant profile representative of the background "B", the N$^{16}$ exponential decay curve representative of the stationary oxygen, and the flowing oxygen. This decomposition is carried out by a constrained weighted least-square algorithm which solves by minimizing, for each time interval, the following sum of the weighted squared errors "E$_i$" under a set of linear constraints:

$$\sum_{i=1}^{n} w_i E_i^2$$

subject to the following:

$$R_i = B + C/t_{i+1/2} - t_{i-1/2} \int_{t_{i-1/2}}^{t_{i+1/2}} e^{-\lambda t} dt + Df(t_i) + E_i$$

and B$>$=0; C$>$=0; D$>$=0; and f(t$_i$)$>$=0 for i=1, n where "R$_i$" is the number of measured counts in time interval "i", "t$_i$" is the mean time of the i-th time interval measured from the end of the irradiating period, "$\lambda$" is the decay constant for N$^{16}$, "B" is the background composed of counts from gamma rays produced by radioactive components present in the cement and/or earth, such as thorium, uranium and potassium, and iodine 128 when a sodium iodide detector is used, "C e$^{-\lambda t}$" is the number of counts in time interval "i" due to stationary oxygen, "D f(t$_i$)" is the number of counts in time interval "i" due to flowing oxygen, and "E$_i$" is the residual for the i-th time interval, (i.e. the difference between the actual count rate and the predicted count rate). The constraints hereabove mentioned on "B", "C", "D" and f(t$_i$) are given by way of example and could be changed without departing from the invention.

Generally speaking, in order to determine the velocity of the water flow, for a given distance between source and detector(s), the higher the water flow velocity, the shorter the irradiating period. As a matter of example, the distance between the source and the near detector is e.g. in the range of between half a foot and three feet (preferably about 1 foot [0.3 m]), and the distance between the source and the far detector is in the range of between one foot and six feet (preferably about 2 feet [0.61 m]). As a first approximation, for any water velocity less than 5 feet/minute (0.25 m/s), the irradiating period is preferably less than 15 seconds, while for water velocity greater than 20 feet/minute (0.6 m/s), the irradiating period is preferably about 2–3 seconds, it being understood that these numbers are only indicative. The relatively short spacing between the detector(s) and the source is a substantial advantage of the apparatus of the invention with respect to prior art, for at least three reasons. The first advantage is that it reduces the length of the apparatus which is easier to use. The second advantage is that it allows one to build an apparatus, of reasonable length, including two detectors on either side of the source, i.e. one detector above and the other below the source, so as to be sensitive both to upward and downward flow. The third advantage is that the apparatus is more sensitive to low fluid velocities, as will be explained hereafter.

Figure 6:
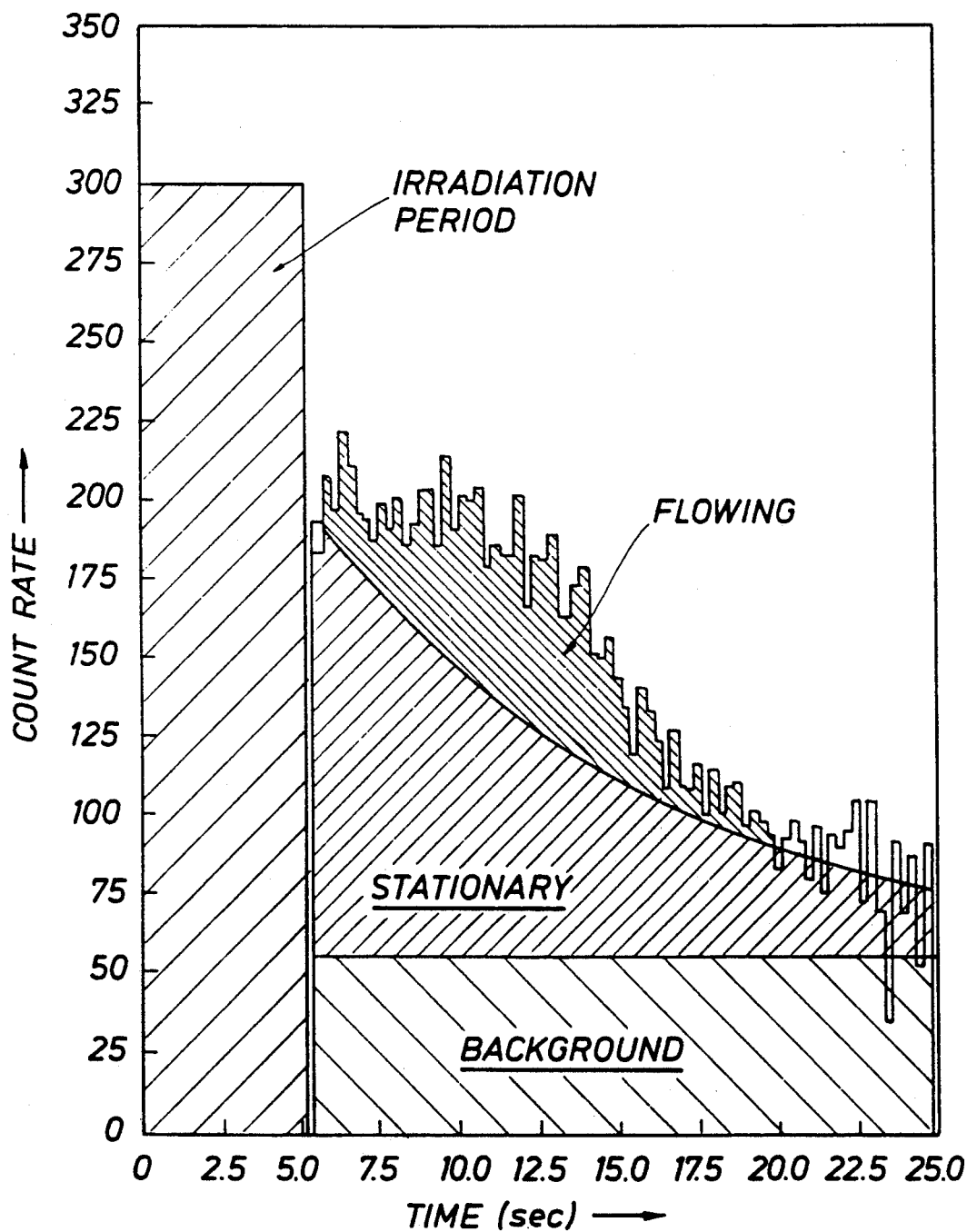
FIG. 6 shows an histogram, similar to the plot of FIG. 2B (far detector) corresponding to a fifth example of irradiating/detecting cycle.

FIG. 6 shows an example of a histogram of counts detected by a near detector, following an irradiating period of 5.2 seconds. In that case, the velocity may be determined by combining both the "peak method" (FIG. 2A-2B, 3A-3B) and the "extrapolation method" (FIG. 4A, 4B) hereabove depicted.

Figure 7A:
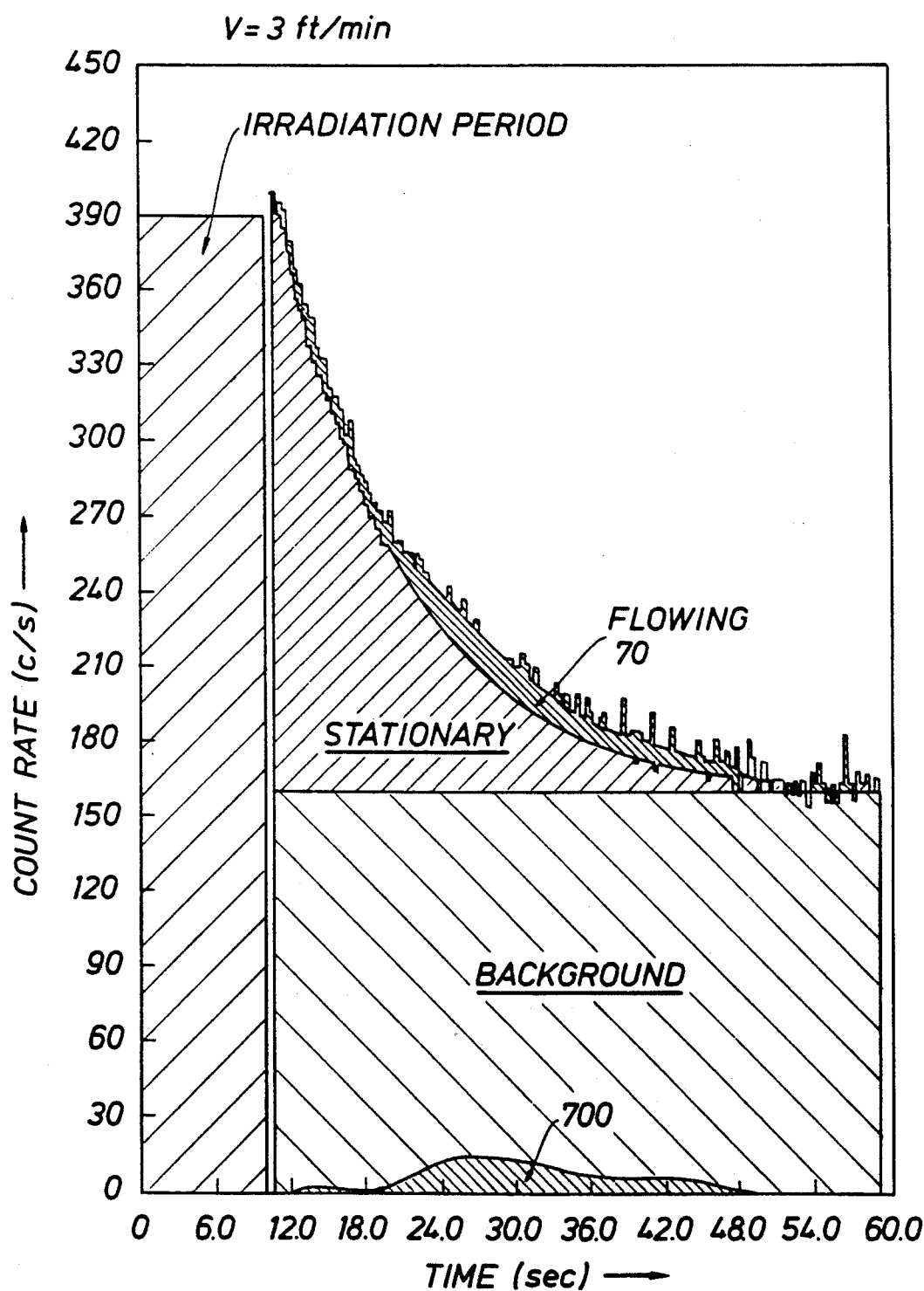
FIGS. 7A, 7B, 7C show histograms similar to those of FIG. 5A (near detector) set for three different flow velocities.
Figure 7B:
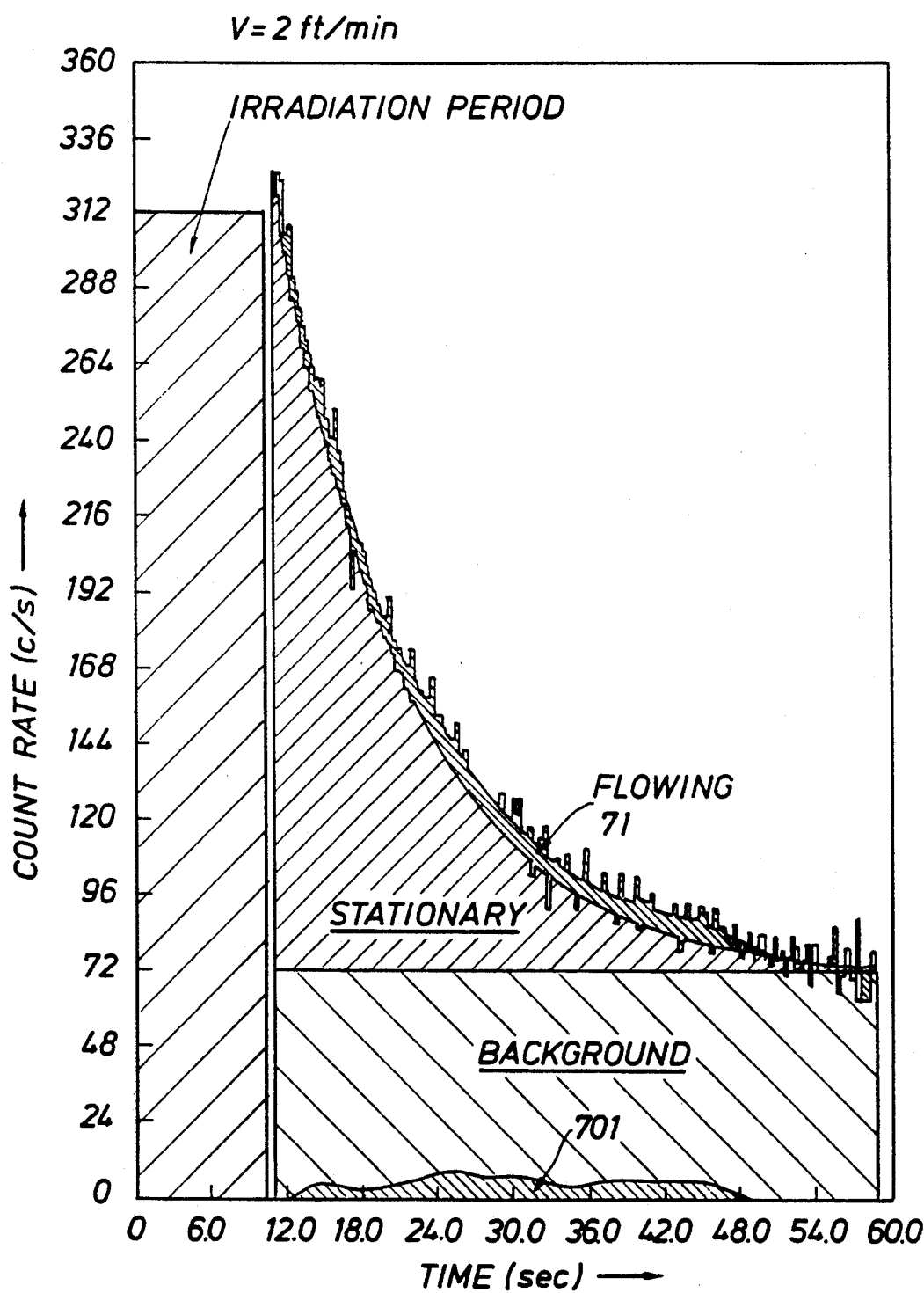
Figure 7C:
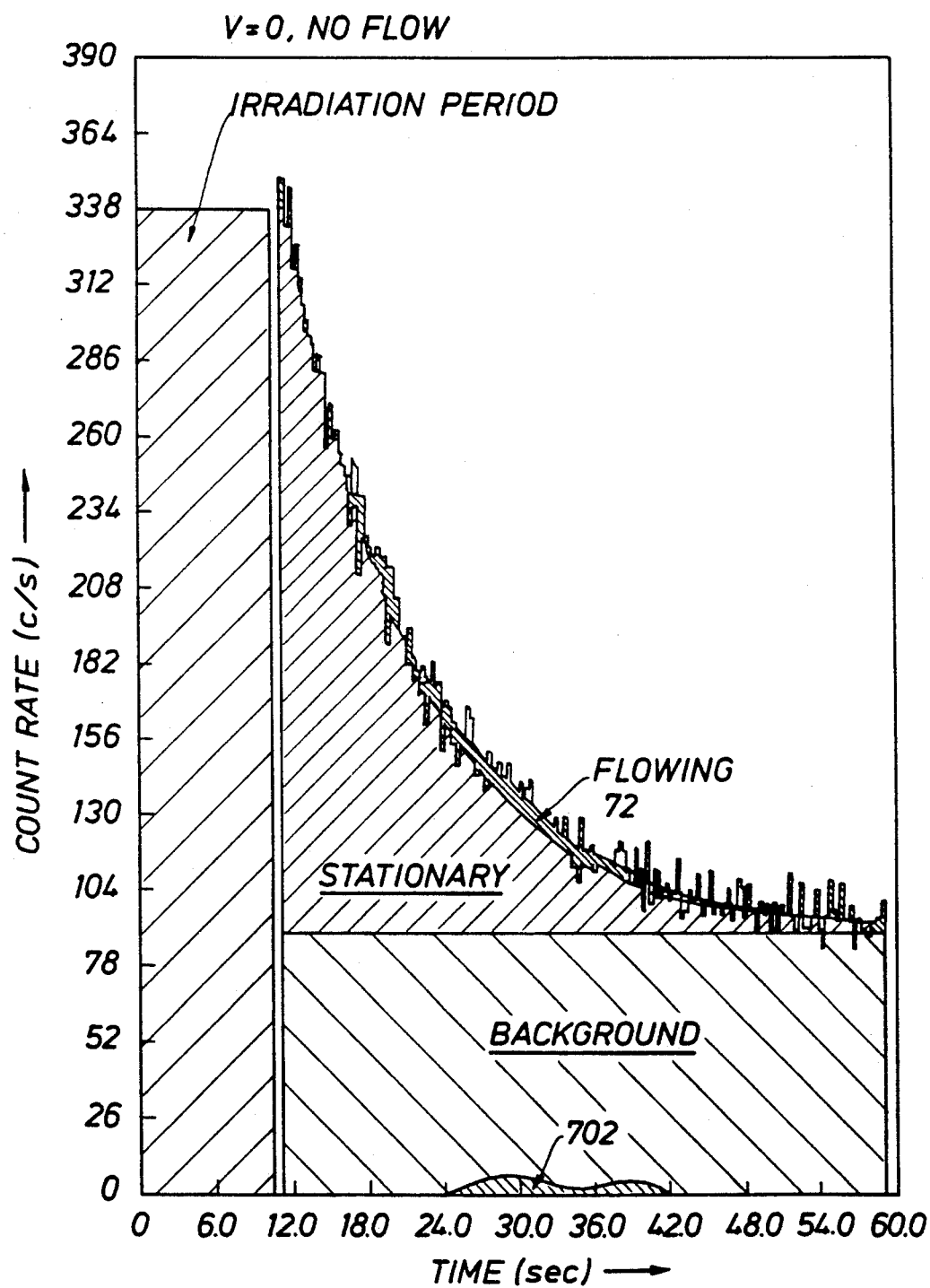

Moreover, the method and apparatus according to the present invention, besides the advantages already referred to, have the further advantage of being able to detect a larger range of flow velocity than the prior art, especially in the lower part of the range. This is all the more important since the water flows encountered in boreholes often have low velocities. FIG. 7A, 7B and 7C show each an histogram of counts versus time, detected by a far detector after an irradiating period of 10 seconds. FIG. 7A corresponds to a water flow velocity of 3 feet/minute (0.015 m/s), FIG. 7B to a velocity of 2 feet/minute (0.01 m/s) and FIG. 7C to a flow of no significant velocity or to no flow. Each histogram comprises different zones, similar to FIG. 2A to 5B, corresponding to the irradiating period, the background, the stationary oxygen, and the flowing oxygen. As can be seen from the histograms, the zone 70, 71, 72 representative of the flow is crescent shaped. However, these zones may not be descriptive enough for the user from the pictorial point of view, although they comprehend data representative of the flow. In order to ease further the interpretation of the counts representative of the flow, the characteristic curves are represented in another way at the bottom of the histograms, on the time axis, by an elongated hatched area referenced respectively 700, 701 and 702. Each elongated zone 700, 701, 702 is made by assigning to each time interval, a count value corresponding to the "height" along a vertical line of the crescent shaped zone. Each elongated area 700, 701, 702, represented along the time axis is more vivid for the user from the graphical point of view. This alternate representation along the time axis, could also be made in connection with plots such as those of FIG. 2A, 2B, 3A, 3B, 4A, 4B. The plot of FIG. 7C, although theoretically corresponding to no flow, shows some characteristic representative of the flow; this is due to the design of the algorithm hereabove referred to, which in any case solves for a flowing profile, even when none exists.

When the flow velocity is very low, such as e.g. below 3 or 4 feet/minute, it might be difficult to calculate the velocity and even assert the existence of any flow. The detection, i.e. the determination of the existence of a water flow, according to another feature of the invention, based on one plot such as one of those shown on FIG. 7A, 7B, 7C, could be carried out by calculating the area of the elongated area (700, 701, 702), thus giving a number of counts representative of the flow, and comparing said number of counts to a predetermined threshold number of counts. Any actual number of counts below this threshold is thus interpreted as the absence of flow, or of any flow of significance. By way of example, this threshold could be set at seventy (70) counts, in connection with the example of the set of FIG. 7A, 7B and 7C, it being understood that this threshold is dependent upon the neutron source output.

While the velocity is related to the position on the time axis of the plots, of an anomaly or characteristic representative of the flow, flow rate affects the area of said characteristic.

Apart from the detection of the flow and the calculation of the flow velocity, the invention further permits one to determine the water flow rate. Actually, the flow rate, along with the location of the water flow in the borehole, is the information of most importance for the user.

According to a first embodiment, the flow rate "Q" is determined by the following formula:

$$Q = C_{flow}/S_{total} \times F(V, d, r_d, L_d, T_{act}, BHOD, Ksing)$$

where "$C_{flow}$" is the number of counts in the characteristic which is representative of the flow, "$S_{total}$" is the total number of neutrons emitted during the irradiating period, "V" and "d" have already been defined, "$r_d$" is the radius of the detector, "$L_d$" is the length of the detector, "$T_{act}$" is the irradiation period, "BHOD" includes borehole compensation factors, and "Ksing" is a parameter characteristic of the casing diameter and density. The function "F" is determined in a laboratory, by measuring the response of the logging tool upon different environmental conditions. "$C_{flow}$" can be determined as the area of the characteristic which is representative of the flow, such as the peak shown on FIG. 2A, 2B, 3A, 3B, or the elongated zone 700, 701, 702 on FIG. 7A, 7B, 7C. It is means here by "area" the area of the characteristic delimited by the exponential decay curve. In the example of FIG. 5A, 5B and 6, the "$C_{flow}$" area corresponds to the respective hatched zones referred to as FLOWING, while in the example of FIG. 4A, 4B the "$C_{flow}$" area corresponds to the respective hatched zones. "$S_{total}$" can be calculated by any known method, either in a laboratory setup, or in situ during the measurement in the well. By way of example, the method described in U.S. Pat. No. 4,760,252 assigned to Schlumberger Technology Corporation, might be suitable.

Figure 8:
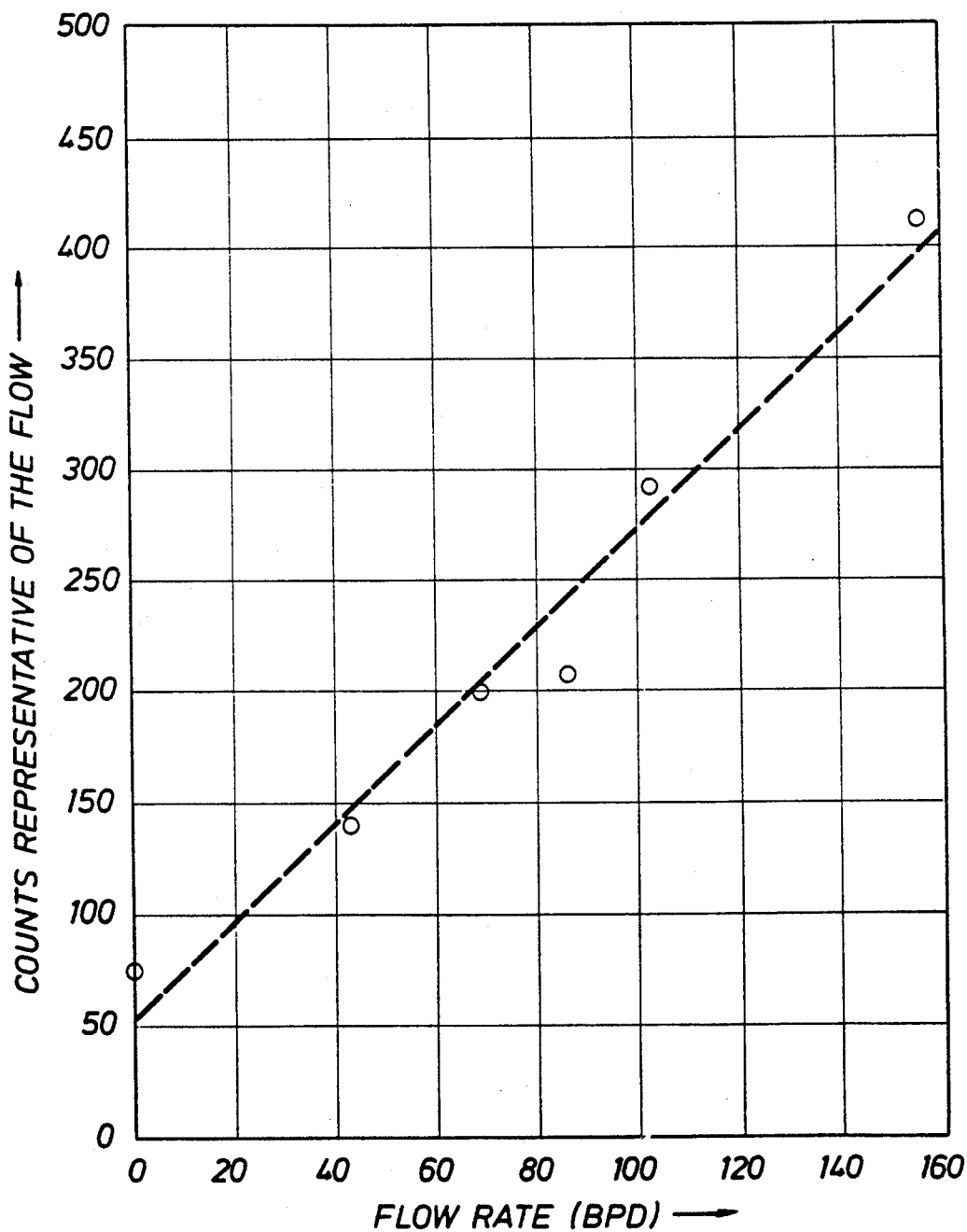
FIG. 8 show counts representative of the flow, plotted versus flow rate, as measured in a laboratory setup after an irradiating period of ten seconds, for a given cross section area of the flow.

According to a second embodiment especially suitable but not exclusively to flow having low velocity, the flow rate "Q" can be determined through the steps described hereafter in relation to FIG. 7A, 7B, 7C and FIG. 8. FIG. 8 shows a plot of counts representative of the flow, versus flow rate (measured in barrel per day; 100 barrels are sensibly equivalent to 15.9 m$^3$). The plot of FIG. 8 is a reference plot made prior to measurements, either by using a laboratory setup or by modelling calculations. According to the invention, it has been discovered that, at least for the low velocities, the counts (representative of the flow) are linearly related to the flow rate. Once an actual plot of count rates versus time (as measured) has been obtained, the area of the characteristic representative of the flow on said actual plot is then calculated, giving an actual number of counts representative of the flow. The actual flow rate is then determined by looking on the reference plot of FIG. 8, for the flow rate value corresponding to said actual number of counts.

All the plots and histograms on the drawing have been made for given radial distances of the flow from the apparatus. Radial distance of the flow may be determined by any usual method involving window energy measurements.

The irradiating period may be provided by either continuous neutrons emission or successive bursts of neutrons. In the preferred embodiment of the invention, the gamma rays are counted after the source is deactivated, and thus high count efficiency is obtained. Alternatively, detection of counts could also be carried out during the irradiating period, i.e. during the time period separating successive bursts of neutrons. This counting could be useful for providing supplemental information for the build-up of the plots of counts versus time, and thus for the determination of the characteristic representative of the flow, especially in connection with FIG. 4A and 4B.

Furthermore, the figures and the relating description depict a specific respective disposition of the source, the detector(s) and the water flow direction, to wit the line passing through the source and the detector(s) being parallel to the water flow direction. This corresponds to the use of the method and apparatus of the invention in a well. However, the invention could also be implemented in such a way that the source/detector(s) line is inclined at a given angle, or substantially perpendicular, to the water flow direction.

A further advantage of the invention, consists of the possibility of using existing nuclear logging tool at the cost of slight modifications.

although the invention has been described and illustrated with reference to a specific embodiment thereof, it will be understood by those skilled in the art that various modifications and variations of that embodiment may be made without departing from the invention concepts disclosed. Accordingly, all such modifications are intended to be included within the spirit and scope of the appended claims.

What is claimed is:

1. A method for detecting and quantifying water flow which is not directly accessible, comprising:
   irradiating the water flow with a source of neutrons of sufficient energy to interact with oxygen atoms in the water, according to the activation reaction $O^{16}(n,p)N^{16}$ and wherein the duration of said irradiating step is comprised between one-fifth of and three $N^{16}$ half-lives;
   stopping said irradiation;
   detecting, during cessation of said irradiation, at a location spaced from said source, the gamma rays emitted during disintegration of $N^{16}$ atoms and wherein the duration of said detecting step is at least one $N^{16}$ half-life;
   counting and recording the gamma rays detected during said cessation period so as to establish a relationship of counts versus time; and
   deriving from said relationship information related to said water flow.

2. The method according to claim 1 wherein said irradiating step is cyclically started and interrupted.

3. The method according to claim 1 further including carrying out, at the same location in the borehole, successive cycles of irradiating/detecting steps.

4. The method according to claim 1 wherein said function comprises a plot of counts versus time.

5. The method according to claim 1 comprising:
   determining in said function a characteristic which is representative of the water flow and which departs from the exponential decay curve of $N^{16}$ atoms fracturing the stationary oxygen; and
   calculating the velocity "V" of the water flow from the formula V=d/t, where "d" is the distance between the source and the detecting location, and "t" is a time period between the irradiating step and the time corresponding to said characteristic.

6. The method according to claim 5 wherein:
   the duration of said irradiating step is comprised between a fifth of and three $N^{16}$ half-lives;
   said characteristic includes a peak; and
   said time period "t" starts from the mid-time of said irradiating step and ends at the time corresponding to said peak.

7. The method according to claim 1 further comprising:
   determining in said function a characteristic which is representative of the water flow and which departs from the exponential decay curve of $N^{16}$ atoms featuring the stationary oxygen;
   determining for each of the time intervals related to said characteristic, the number of counts representative of the flow;
   summing the number of counts representative of the flow detected in each of said time intervals; and
   detecting the presence of water flow by comparing to a predetermined threshold value said number of counts representative of the flow.

8. The method according to claim 7 wherein said function is a plot of counts versus time, and said number of counts corresponds, on said plot, to the area of said characteristic delimited by said exponential decay curve.

9. The method according to claim 8 wherein said characteristic comprises a peak and is represented on said plot on the time axis after having subtracted, for each of said time intervals, the counts corresponding to said exponential decay curve.

10. The method according to claim 1 further including the step of deriving the water flow rate "Q" from the formula:

$$Q = F \times C_{flow}/S_{total}$$

where $C_{flow}$ is the number of counts representative of the flow, $S_{total}$ is the total number of neutrons emitted during the irradiating step, and "F" is a function of environmental parameters.

11. The method according to claim 10 further comprising:
    determining in said function a characteristic which is representative of the water flow and which departs from the exponential decay curve of $N^{16}$ atoms featuring the stationary oxygen;
    determining for each of said intervals related to said characteristic, the number of counts representative of the flow;
    deriving $C_{flow}$ from the sum of the number of counts representative of the flow detected in each of said time intervals; and
    calculating the flow rate "Q".

12. The method according to claim 11 wherein said function is a plot of counts versus time, and $C_{flow}$ is calculated as the area of said characteristic on said plot, delimited by said exponential decay curve.

13. The method according to claim 1 comprising:
    establishing, prior to the actual measurements, a reference function between the number of counts representative of the flow and the flow rate;
    carrying out actual measurements of the water flow under investigation by establishing an actual function of counts versus time;
    determining from said actual function the actual number of counts representative of the actual flow; and
    deriving from said actual number of counts and from said reference function, the actual flow rate.

14. An apparatus for detecting and quantifying water flow which is not directly accessible, comprising:
    means for irradiating the water flow with a source of neutrons of sufficient energy to interact with oxygen atoms in the water, according to the activation reaction $O^{16}(n,p)N^{16}$ and wherein said irradiating means is actuated between one fifth of and three $N^{16}$ half-lives;
    means for stopping said irradiation;
    means for detecting, during cessation of said irradiation, at a location spaced from said source, the gamma rays emitted during disintegration of $N^{16}$ atoms and wherein said detecting means is actuated for at least one $N^{16}$ half-life;
    means for counting and recording the gamma rays detected during said cessation period so as to establish a relationship of counts versus time; and means for deriving from said relationship information related to said water flow.

15. The apparatus according to claim 14 wherein said irradiating means is cyclically activated and deactivated.

16. The apparatus according to claim 14 further including means for carrying out, at the same location in the borehole, successive cycles of irradiation/detection.

17. The apparatus according to claim 14 wherein said function comprises a plot of counts versus time.

18. The apparatus according to claim 14 comprising:
means for determining in said function a characteristic which is representative of the water flow and which departs from the exponential decay curve of $N^{16}$ atoms featuring the stationary oxygen; and
means for calculating the velocity "V" of the water flow from the formula V=d/t, where "d" is the distance between the source and the detecting location, and "t" is a time period between the irradiation and the time corresponding to said characteristic.

19. The apparatus according to claim 18 wherein:
the irradiating means is actuated for a duration comprised between a fifth of and three $N^{17}$ half-lives;
said characteristic includes a peak; and
said time period "t" starts from the mid-time of the irradiation and ends at the time corresponding to said peak.

20. The apparatus according to claim 14 further comprising:
means for determining in said function a characteristic which is representative of the water flow and which departs from the exponential decay curve of $N^{16}$ atoms featuring the stationary oxygen;
means for determining for each of the time intervals related to said characteristic, the number of counts representative of the flow;
means for summing the number of counts representative of the flow detected in each of said time intervals; and
means for detecting the presence of water flow by comparing to a threshold value said number of counts representative of the flow.

21. The apparatus according to claim 20 wherein said function is a plot of counts versus time, and said number of counts corresponds, on said plot, to the area of said characteristic delimited by said exponential decay curve.

22. The apparatus according to claim 21 wherein said characteristic comprises a peak and is represented on said plot on the time axis after having subtracted, for each of said time intervals, the stationary oxygen counts corresponding to said exponential decay curve.

23. The apparatus according to claim 14 further including means for deriving the water flow rate "Q" from the formula:

$$Q = F \times C_{flow}/S_{total}$$

where $C_{flow}$ is the number of counts representative of the flow, $S_{total}$ is the total number of neutrons emitted during the irradiation, and "F" is a function of environmental parameters.

24. The apparatus according to claim 23 further comprising:
means for determining in said function a characteristic which is representative of the water flow and which departs from the exponential decay curve of $N^{16}$ atoms featuring the stationary oxygen;
means for determining for each of said intervals related to said characteristic, the number of counts representative of the flow;
means for deriving $C_{flow}$ from the sum of the number of counts representative of the flow detected in each of said time intervals; and
means for calculating the flow rate "Q".

25. The apparatus according to claim 24 wherein said function is a plot of counts versus time, and $C_{flow}$ is calculated as the area of said characteristic on said plot, delimited by said exponential decay curve.

26. The apparatus according to claim 14 comprising:
means for establishing, prior to the actual measurements, a reference function between the number of counts representative of the flow and the flow rate;
means for carrying out actual measurements of the water flow under investigation by establishing an actual function of counts versus time;
means for determining from said actual function the actual number of counts representative of the actual flow; and
means for deriving from said actual number of counts and from said reference function, the actual flow rate.

* * * * *